(12) United States Patent
Salama

(10) Patent No.: US 6,905,577 B1
(45) Date of Patent: Jun. 14, 2005

(54) METHOD FOR OXIDATION OF VOLATILE ORGANIC COMPOUNDS CONTAINED IN GASEOUS EFFLUENTS AND DEVICE THEREOF

(75) Inventor: Amir Salama, Granby (CA)

(73) Assignee: Ozomax Inc., Granby (CA)

( * ) Notice: Subject to any disclaimer, the term of this patent is extended or adjusted under 35 U.S.C. 154(b) by 905 days.

(21) Appl. No.: 09/624,037

(22) Filed: Jul. 24, 2000

(51) Int. Cl.[7] .................................................. H05F 3/00
(52) U.S. Cl. ...................................... 204/164; 588/227
(58) Field of Search ........................... 204/164; 588/227

(56) References Cited

U.S. PATENT DOCUMENTS

| | | | |
|---|---|---|---|
| 3,881,874 A | | 5/1975 | Shular et al. ................ 422/105 |
| 3,970,567 A | * | 7/1976 | Lowther ................ 422/186.08 |
| 4,124,529 A | | 11/1978 | Juntgen et al. ............. 502/432 |
| 4,257,783 A | | 3/1981 | Gutjahr et al. ................ 95/112 |
| 4,261,707 A | | 4/1981 | Bradshaw et al. ............ 95/192 |
| 4,265,642 A | | 5/1981 | Mir et al. ...................... 95/154 |
| 4,353,715 A | | 10/1982 | Mir et al. ....................... 95/37 |
| 4,420,415 A | | 12/1983 | Yuki et al. ................... 502/180 |
| 4,954,320 A | * | 9/1990 | Birmingham et al. .. 422/186.04 |
| 5,021,164 A | | 6/1991 | Gay ........................... 210/694 |
| 5,149,584 A | | 9/1992 | Baker et al. ................. 442/354 |
| 5,165,969 A | | 11/1992 | Barlett et al. ................ 427/421 |
| 5,413,866 A | | 5/1995 | Baker et al. ............. 423/447.2 |
| 5,458,784 A | | 10/1995 | Baker et al. ................. 210/674 |
| 5,542,967 A | | 8/1996 | Ponizovsky et al. ........... 96/82 |
| 5,573,733 A | * | 11/1996 | Salama .................. 422/186.18 |
| 5,601,633 A | | 2/1997 | Ponizovsky et al. ........... 95/81 |
| 5,814,132 A | | 9/1998 | Grime et al. ................. 95/123 |

* cited by examiner

Primary Examiner—Kishor Mayekar
(74) Attorney, Agent, or Firm—Robic

(57) ABSTRACT

The present invention relates to both a method and a device for removing Volatile Organic Compounds (VOC) from gaseous streams in conduits, chimneys and/or exhaust ducts. The method is especially useful in eliminating a large variety of pollutants, and especially organic odorous pollutants such as mercaptans and sulfurous compounds. The method is based on the principle of direct oxidation of the pollutants by ozone and the conversion of these pollutants into non-harmful products, and comprises the steps of: a) providing an electrical corona discharge reactor capable of producing ozone; b) supplying an electric current to the corona discharge reactor; and c) causing the gaseous effluents to flow through the reactor. With this method, the volatile organic compounds contained in the gaseous effluents are oxidised by the ozone produced by the corona discharge reactor. The present invention also relates to a device for reducing this method into practice, this device being a corona discharge reactor comprising two concentric electrodes producing ozone.

11 Claims, 6 Drawing Sheets

METHOD FOR OXIDATION OF VOLATILE ORGANIC COMPOUNDS CONTAINED IN GASEOUS EFFLUENTS AND DEVICE THEREOF

BACKGROUND OF THE INVENTION a) Field of the Invention

The present invention relates to both a method and a device for removing ecologically noxious Volatile Organic Compounds (VOC) from gaseous streams in conduits, chimneys and/or exhaust ducts. The method is based on the principle of the direct oxidation of VOC by ozone and is especially useful in eliminating a large variety of organic odorous pollutants, such as mercaptans and others sulfurous compounds, by converting them into non-harmful, environmentally friendly products.

b) Description of the Prior Art

To carry out the elimination of Volatile Organic Compounds (VOC) and other organic compounds from gaseous effluents, it is known to adsorb them with activated carbon or with a fibrous bed. It is also a common practice to use aqueous solutions to scrub the gases and thereby remove the VOC. Another method is to burn and destroy the VOC by the action of heat, combined or not with metal catalysts, using a thermal incinerator. The problems related with these methods are numerous. The activated carbon adsorption method requires frequent regeneration (steam, hot nitrogen or thermal) and regular replacement of the activated carbon. The water scrubber method requires the separation of the solvents from the soiled water prior to their reintroduction into the scrubber while the thermal incineration requires the burning of fuel to maintain an appropriate temperature inside the incinerator. Accordingly, all of these known methods not only demand high capitalization costs but they are further very expensive to operate.

A simpler approach is the use of High Energy Corona (HEC) which permits the removal of ecologically noxious substances from gases at relatively low temperatures. U.S. Pat. Nos. 5,542,967 and 5,601,633 disclose respectively an apparatus and a method using an electrical precipitator wherein a stream of gases is subjected to micro plasma discharges. These electrical discharges break down the VOC into carbon and other by-products like a micro-incinerator. However, the method and apparatus described in these two patents are expensive to use due to their high energy demand. They are furthermore different from the present invention in that they require a power supply and a multistage Fitch generator in order to provide the very high voltage necessary to produce the electrical discharges. They also aim in producing highly active intermediate substituents other than ozone.

Recently, U.S. Pat. No. 5,573,733, disclosing an ozone generator was granted to the present inventor. The technology behind this ozone generator is innovative and could be used in the treatment of gaseous effluents. By creating a very oxidizing environment one could fully or partially break down the organic pollutants contained in gaseous effluents and transform these pollutants into more environmentally friendly products such as $H_2O$, $CO_2$ and $SO_2$.

Accordingly, there is thus a need for a simple, efficient and cheap reactor and method thereof which are based on the use of ozone for the treatment of polluted gaseous effluents. The present invention fulfils these needs and avoids or overcomes the various previously mentioned disadvantages of the prior art. The present invention also fulfils other needs as will be apparent to those skilled in the art upon reading the following specification.

SUMMARY OF THE INVENTION

A main object of the invention is to provide an efficient and economical method for the treatment and purification of gaseous effluents containing a large variety of pollutants such as those found in the effluents of many organic processing plants (petrochemicals, solvent manufacturing, solvent recycling, waste water lift stations, insecticides, pesticides, and food industries such as in the baking & frying sectors).

The method according to the invention permits the purification of air or of any gaseous stream by the in situ oxidation of pollutants thereby removing the undesirable oxidation products. More specifically, a first object of the invention is to provide a method for the oxidation of volatile organic compounds contained in gaseous effluents, comprising the steps of:

a) providing an electrical corona discharge reactor capable of producing ozone;

b) supplying an electric current to the corona discharge reactor in order to generate corona discharge; and c) causing the gaseous effluents to flow through the corona discharge reactor;

whereby the volatile organic compounds contained in the gaseous effluents are oxidised by the ozone produced by the corona discharge reactor.

To improve its efficacy, the method of the invention further preferably comprises at least one of the additional steps of:

d) causing the gaseous effluents to contact a metal catalyst whereby volatile organic compounds remaining in the gaseous effluents are further oxidised; and/or e) subjecting the gaseous effluents to UV radiation, whereby volatile organic compounds remaining in the gaseous effluents are further oxidised.

Another object of the invention is to provide a device allowing to carry out the aforesaid method. Accordingly, the invention provides an electrical corona discharge reactor for the oxidation of volatile organic compounds contained in gaseous effluents, comprising at least two concentric spaced apart electrodes between which the gaseous effluents flow. An outer hollow cylinder incorporates a first electrode. The outer cylinder has an inner surface and an outer surface and forms an outer duct wherein the gaseous effluents flow. The outer surface of the outer cylinder incorporates the first electrode. An inner cylinder incorporates a second electrode and has an outer surface facing the inner surface of the outer cylinder. The inner cylinder is concentrically positioned inside the outer cylinder and also spaced apart and electrically insulated therefrom. When an electric current is supplied to the reactor, ozone is produced between the two electrodes, the ozone produced oxidises the volatile organic compounds contained in the gaseous effluents.

Advantageously, the outer surface of the inner cylinder is provided with a plurality of protrusions that may be coated with a metal catalyst.

Preferably the inner cylinder is hollow and forms an inner duct inside and insulated from the outer duct. It is then possible to flow a gas or a liquid inside the inner duct to regulate the temperature inside the reactor. Generally, a flow of a cooling gas or of a cooling liquid will circulate into the inner cylinder to lower the temperature into the reactor.

Steps a) to e) of the method of the invention may be advantageously reduced to practice using a device incorporating in a single reactor all the necessary elements. It is thus another object of the invention to provide an electrical corona discharge reactor for the oxidation of volatile organic compounds contained in gaseous effluents, comprising at least two concentric spaced apart electrodes between which the gaseous effluents flow, wherein:

an outer hollow cylinder incorporates an electrode, the outer cylinder having an inner surface and an outer surface and forming an outer duct wherein the gaseous effluents flow. The outer cylinder is made of a dielectric and UV permeable material and its outer surface is coated with a material both UV permeable and electrically conductive;

a hollow inner cylinder incorporates a second electrode. The hollow inner cylinder has an outer surface facing the inner surface of the outer cylinder. The outer surface of the inner cylinder is preferably coated with a metal catalyst and comprises a plurality of protrusions. The inner cylinder is concentrically positioned inside the outer cylinder, spaced apart and electrically insulated therefrom. The hollow inner cylinder forms an inner duct wherein a gas or a liquid can flow inside in order to regulate the temperature into the reactor; and at least one electric UV lamp capable of producing UV rays is positioned close to the outer surface of the outer cylinder.

In use, ozone is produced between the two electrodes of the reactor when an electric current is supplied thereto. The ozone produced oxidises the volatile organic compounds contained in the gaseous effluents flowing inside the said reactor, and the metal catalyst and the UV rays further oxidise the volatile organic compounds remaining in the gaseous effluents.

The present invention will be better understood with reference to the following non-restrictive description of several preferred embodiments of the invention, made with reference to the following drawings.

DETAILED DESCRIPTION OF THE INVENTION

The present invention aims to provide a simple, efficient and economical method for the oxidation of Volatile Organic Compounds (VOC), as well as other undesirable compounds such as $H_2S$, $NH_4$, mercaptans, and chlorinated solvents which can be present in gaseous effluents, by the use of ozone ($O_3$). Ozone is known to be an unstable, powerfully oxidizing agent with the ability to break down VOC, $H_2S$ and $NH_4$ into $H_2O$, $CO_2$, $SO_2$, and other by-product(s) as depicted in this very simple equation:

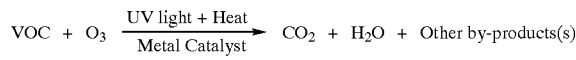

$$VOC + O_3 \xrightarrow[\text{Metal Catalyst}]{\text{UV light + Heat}} CO_2 + H_2O + \text{Other by-products(s)}$$

As documented in the prior art and depicted in the above equation, UV light, heat, and metal catalysts aid the oxidation of the VOC by accelerating the oxidation reactions and/or by oxidizing recalcitrant organic molecules which have not been entirely oxidized by $O_3$ alone.

The method of the invention comprises the use of an electrical corona discharge reactor capable of producing ozone. As it is well known in the art, during a corona discharge, a faint glow envelops a high-field electrode and is often accompanied by streamers directed toward a low-field electrode. Various types of corona reactors can be use according to the invention, with the provision that the reactors produce ozone in quantities sufficient to achieve the objects of the invention.

Figure 1:
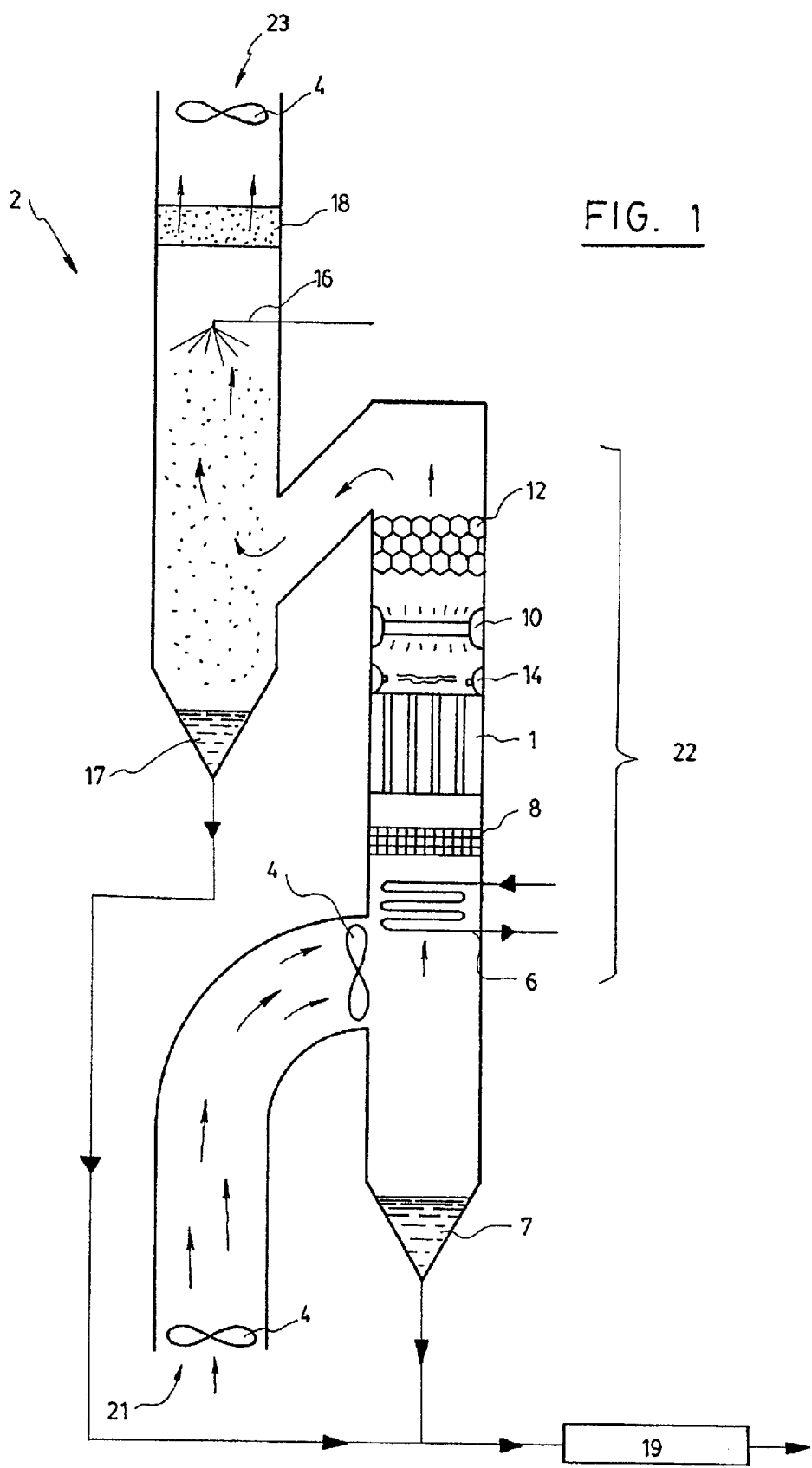
FIG. 1 is a schematic cross-sectional view of a chimney incorporating an electrical corona discharge reactor according to the invention for treating the effluents with ozone.
Figure 2:
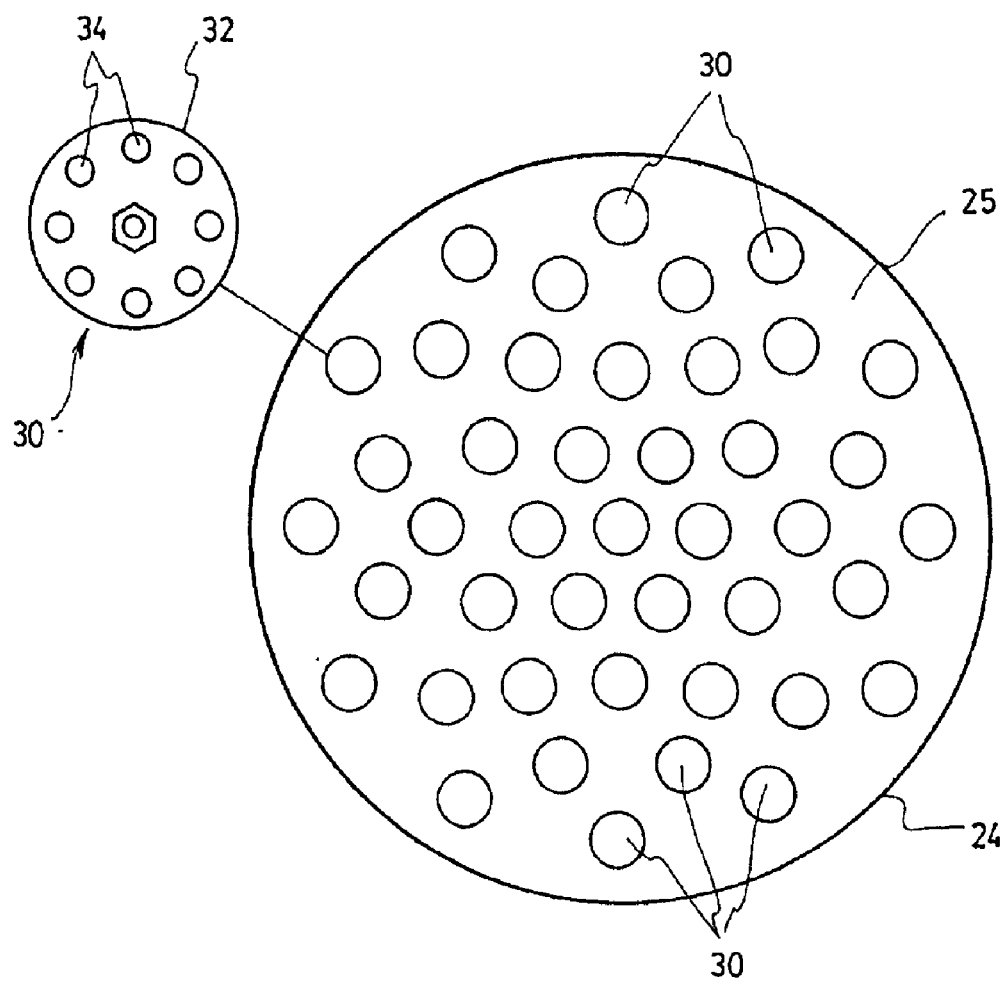
FIG. 2 is a top plan view of an electrical corona discharge reactor capable of producing ozone according to a preferred embodiment of the invention, with an enlargement showing an end of an ozone producing tube through which the gaseous effluents flow.

As shown in FIG. 1, the electrical corona discharge reactor 1 can be installed inside steam conduits, chimneys and/or exhaust ducts. A preferred configuration is an elongated, vertical and tubular chimney 2 having an inlet 21, an outlet 23 and an intermediary portion 22 wherein the gaseous effluents to be treated flow. The chimney 2 may be of any appropriate size and configuration and can be made of any suitable material, preferably of either metallic or temperature resistant metallic material. The chimney 2 may comprise fan(s) or blower(s) 4 for helping in the introduction and circulation inside the chimney 2 of the gaseous effluents.

In use, the gaseous effluents will flow totally or partially into the corona reactor 1 and will be subjected to a high electrical voltage in the range of about 5 kV to about 50 kV. Under such voltages, the reactor 1 will produce ozone and other very active oxidizing species which will break down the VOC into $H_2O$, $CO_2$ and $SO_2$ as depicted in the hereinabove mentioned equation.

According to the needs of the user, the chimney 2 may further comprise one or more of the following elements, the sequence into which these elements are installed being also subjected to the user's needs:

a condenser 6, the corona discharge reactor 1, through which circulates a gas or a liquid. Such a condenser 6 will help to reduce the water content of the effluents by condensing the water into a first receiving container 7 before the gaseous effluents are directed through the reactor 1;

a filter 8, upstream the corona discharge reactor 1, for removing solid particles that may be present in the effluents before the effluents are introduced inside the reactor 1;

an injector 14 preferably upstream the reactor 1 for introducing into the duct one or more sprays of a gaseous catalyst such as ozone, and/or mist of an aqueous solution or of a suspension of a metal catalyst or salts thereof to further oxidize the VOC and/or other undesirable compounds and by-products which have not been totally oxidized by the corona reactor 1;

a lamp 10, with an electromagnetic wave length between 189 and 254 nm, capable of producing UV rays in order to submit the gaseous effluents to a UV treatment;

a catalytic bed 12, of either metal and non-metal material which is compatible with ozone, and comprising a catalyst such as $PdCl_2$—MgO—Cu, $Mn^{2+}$, Co, BiCu, CoCu, Ag, ZnO, Cu—Mn, V—Cu, Cu—Mn, VCu, $Co^{2+}$, UO—$MoO_3$—Cu, Ag, AgO, Mo, W, Ti, V, $V_2O_5$—$K_2SO_4$, Mo—V—P—Na, V—P, Mn—Co, a combination thereof or alloys containing them. The catalytic bed 12 will help to further oxidize the VOC and other undesirable compounds and by-products contained in the gaseous effluents downstream the reactor 1;

a spray 16 to introduce into the chimney 2 water or a mildly alkaline aqueous solution combined or not with a packing material such as Raschig rings or other bed packing material known to increase the surface contact between ozone and the VOC, and thereby scrub the gaseous effluents by dissolving the remaining undesirable compounds and/or by-products into a second container 17 before the gaseous effluents exit the duct 2; and an ozone destruction unit 18 to convert residual ozone back to oxygen before the gaseous effluents exit the duct 2.

The soiled aqueous solutions which have accumulated in the first 7 and second containers 17 can be treated with a treatment unit 19 for removing any pollutant therein. These solutions may be subsequently used by the spray 16 or sent to the sewers.

Referring now to FIGS. 2 to 6, there is shown a particularly preferred embodiment of the invention combining, in a single module, many of the different oxidation reaction steps listed hereinabove. The electrical corona discharge reactor 1 consists of a circular vessel 24, devised to be installed inside a chimney, and comprises at least one, preferably a plurality, of vertically aligned corona tubes 30 having a length varying from few inches to several feet. Similar corona tubes producing ozone are described in detail in U.S. Pat. No. 5,573,733 which is incorporated herein by reference. Each tube 30 comprises two electrodes 40,50 incorporated respectively into concentric spaced apart outer and inner cylinders 42,52 forming a gap 45, having from few millimeters to several centimeters, through which the gaseous effluents to be treated flow. If necessary, the tubes 30 can be adapted to allow direct injection of ozone or of another catalyst, directly into the gap 45.

Figure 3:
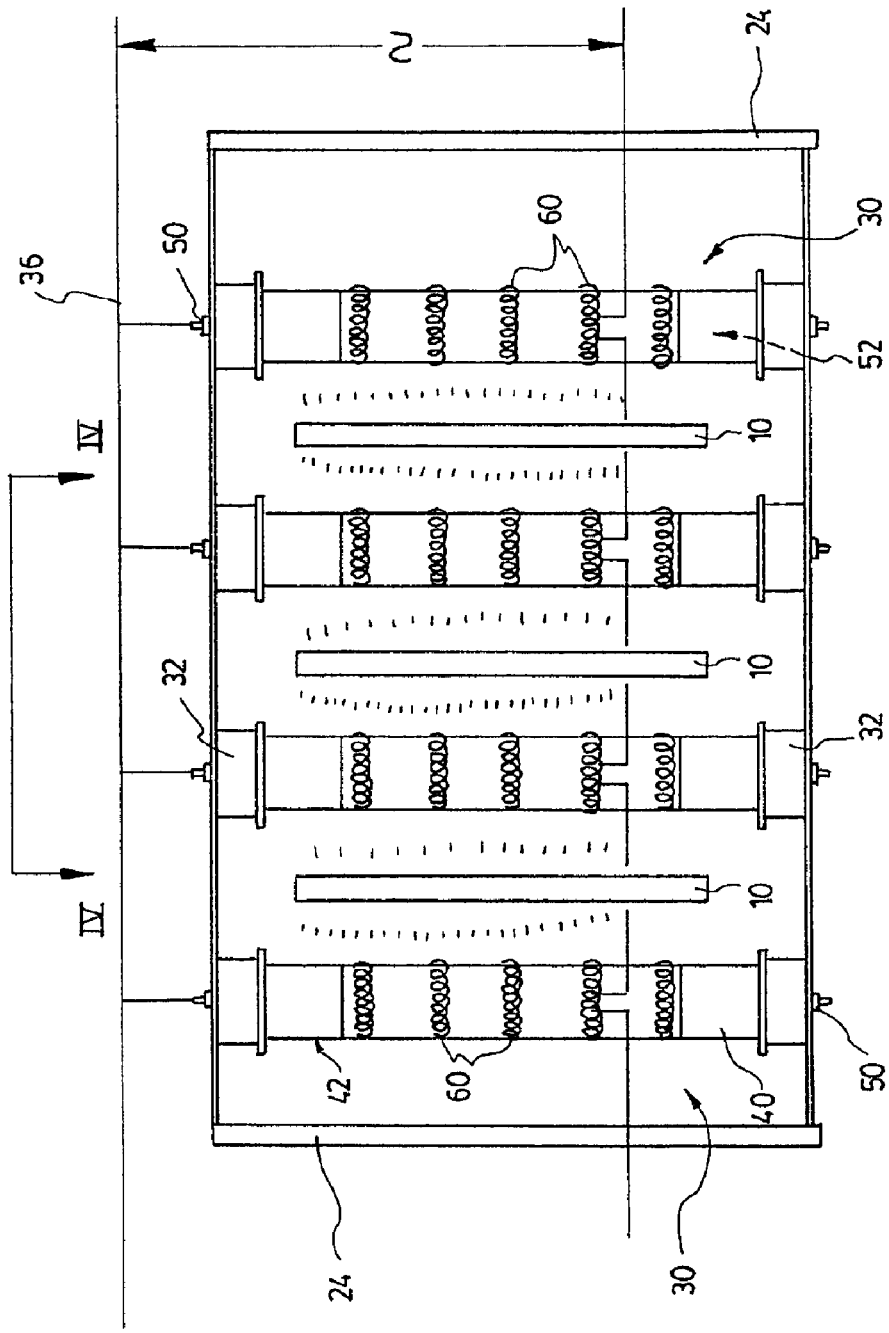
FIG. 3 is a side elevational view of the inside of the electrical corona discharge reactor of FIG. 2 provided with four ozone producing tubes and three UV lamps.
Figure 5:
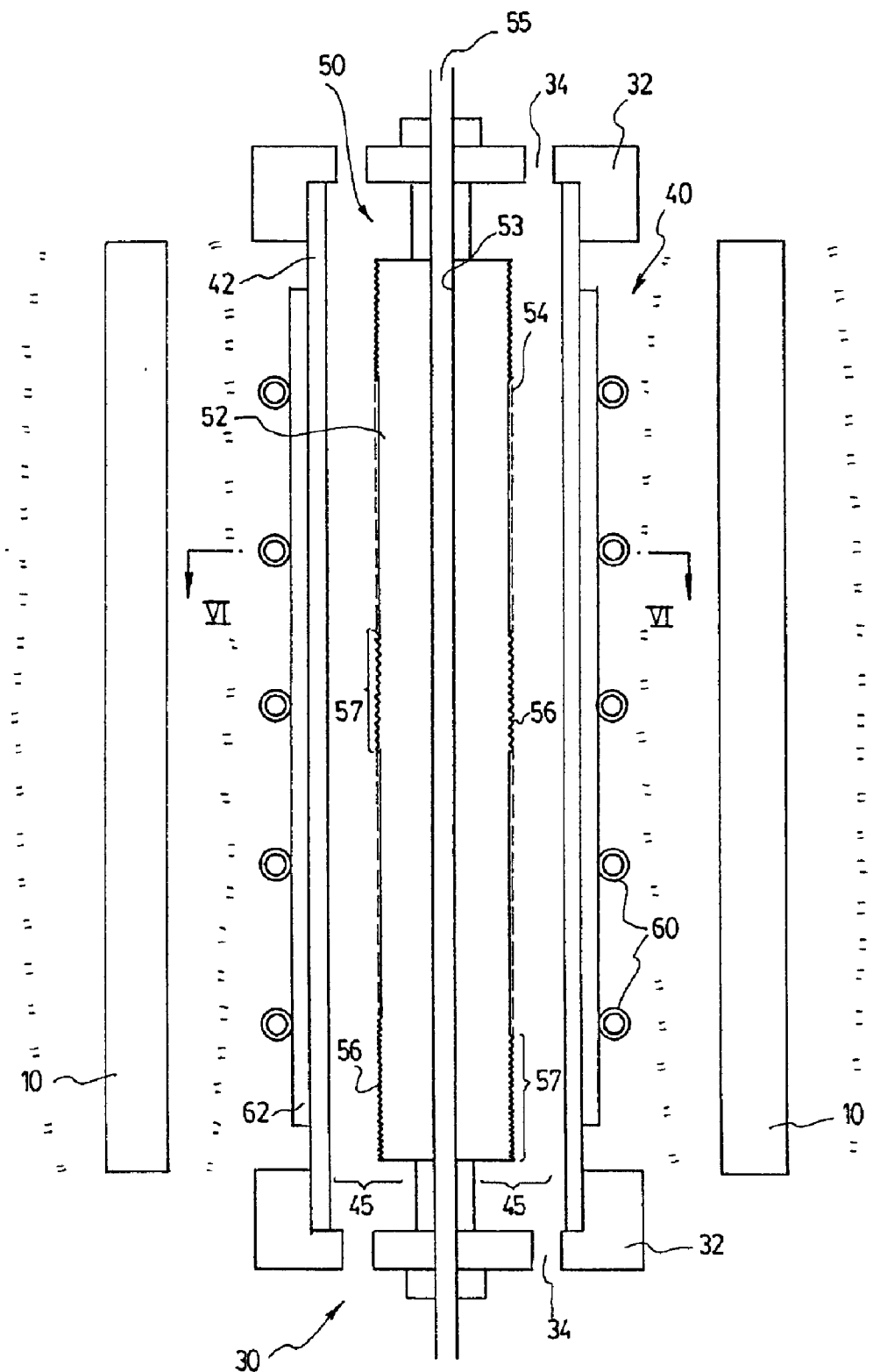
FIG. 5 is a longitudinal cross-sectional view taken along lines 5—5 of FIG. 4.

As best shown in FIGS. 3 and 5, upper and lower covers 32 assemble together the cylinders 42,52 and also carry the high voltage current to the inner electrode 50. Accordingly, covers 32 are preferably made of an electrically insulating material such as CPVC, PVDF, Teflon™, and ceramic, to electrically insulate from each other the electrodes 40,50 and also electrically insulate the said electrodes from the main body of the vessel 24. The covers are further provided with a plurality of holes 34 which allow the effluents to flow between the outer 40 and inner 50 electrodes. The electric current may be distributed in reactor 1 by a pair of electrical wires 36 linking together the electrodes of each tube 30 and connecting them to an electrical source (not shown) producing high voltage AC, DC, Pulsed AC, Pulsed DC or a combination of these currents. Alternatively, the voltage may be distributed to the electrodes by connecting the power supply to a lid 25 composed of an electrically conductive material such as stainless steel.

In use, all of the gaseous effluents will flow through the holes 34 into the gap 45 formed by the two concentric electrodes 40,50 and the pollutants and oxygen contained in the effluents will be subjected to high electrical voltage in the range of about 5 kV to about 50 kV. Electric arcs will form between the two electrodes and begin to break down the VOC while simultaneously producing ozone and other very active oxidizing species which will further break down the VOC into $H_2O$, $CO_2$ and other by-products as depicted in the above-mentioned equation. Preferably, the temperature inside will be controlled within the range of about 50° C. to about 200° C.

Figure 4:
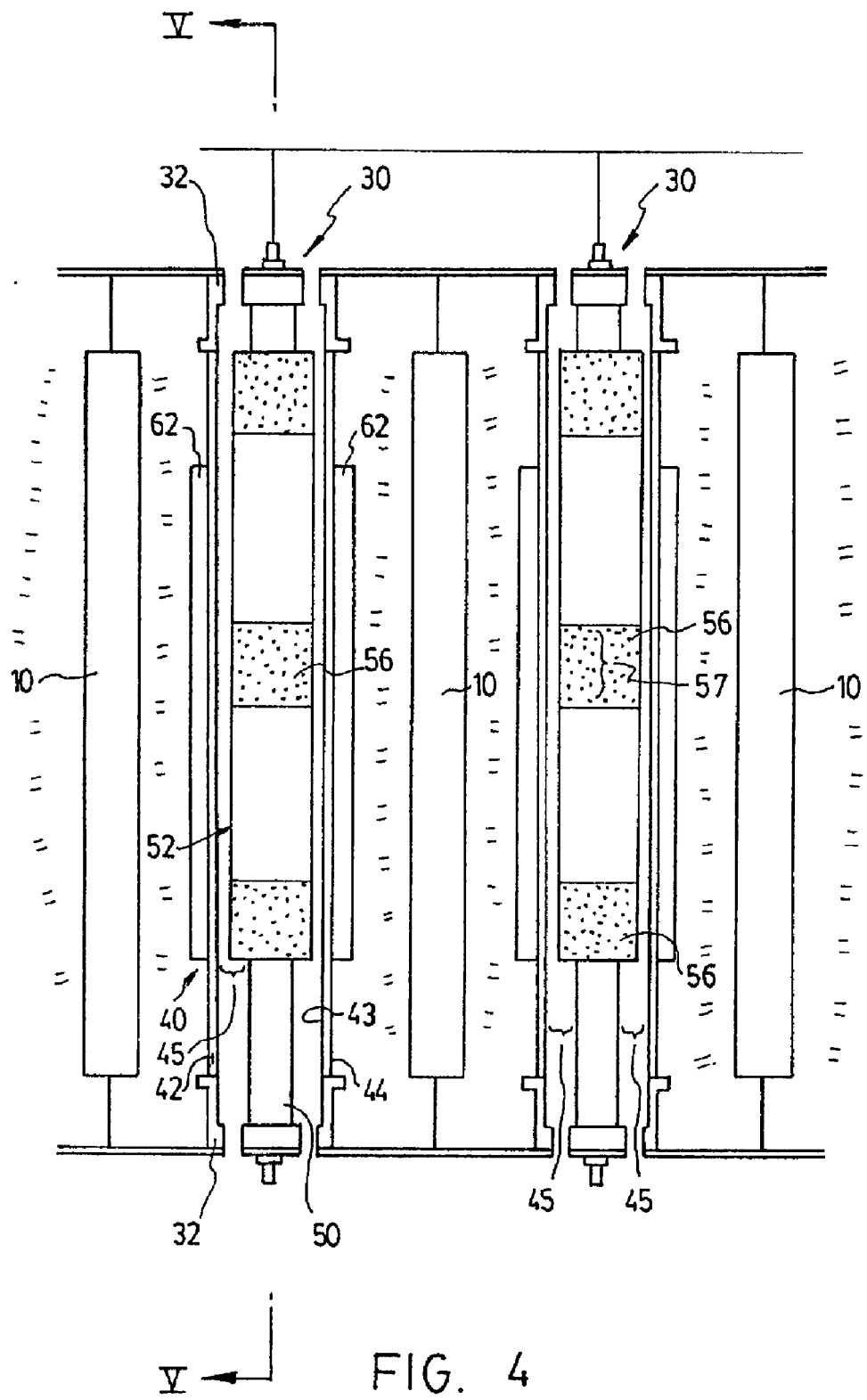
FIG. 4 is a longitudinal cross-sectional view taken along lines 4—4 of FIG. 3 of the inside of the electrical corona discharge reactor, said view showing a portion of the inside of two ozone producing tubes.
Figure 6:
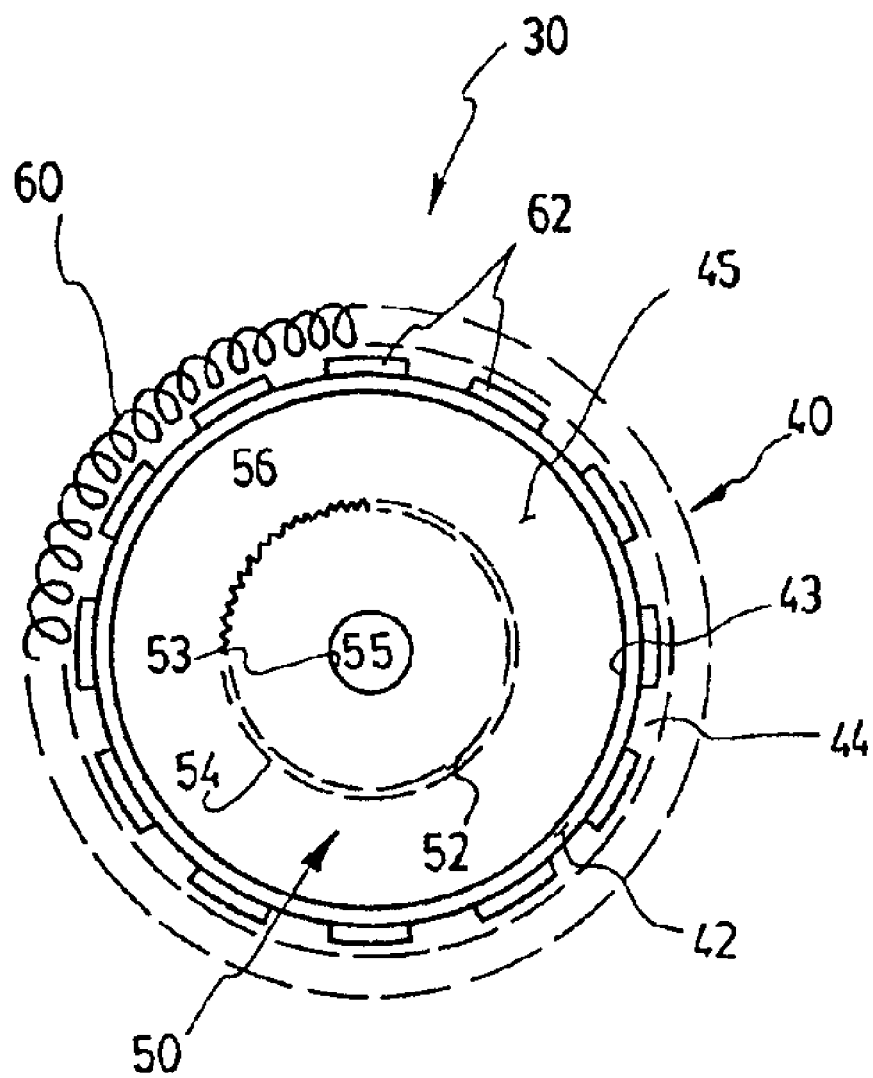
FIG. 6 is a top cross-sectional view of an ozone producing tube taken along lines 6—6 of FIG. 5.

As best shown in FIGS. 4, 5 and 6, the outer cylinder 42 is hollow. It has an inner surface 43 and an outer surface 44 and it forms an outer duct wherein the gaseous effluents flow. The outer cylinder 42 may be made of glass, ceramic, composites, quartz or of any ozone compatible dielectric material.

As mentioned previously, the outer cylinder 42 incorporates a first electrode 40. In a preferred embodiment, the outer cylinder 42 is coated with a transparent electrically conductive material such as tin-oxide, tin-indium oxide, or a very thin layer of gold or platinum layer thereby forming the first electrode 40. Electric current is distributed to this electrode 40 with a plurality of spring-like electrically conductive wires 60 distributed around the outer surface 44 of the outer cylinder 42. Such spring-like wires are also useful in diffusing heat from the outer cylinder 42 to ambient air. As best shown in FIGS. 5 and 6, in an other preferred embodiment the outer cylinder 42 comprises a plurality of electrically conductive strips 62 extending longitudinally on its outer surface 44. The electric current may be distributed to these strips 62 with spring-like electrically conductive wires 60 as explained previously or with a supplementary strip (not shown) extending perpendicularly and connecting together the longitudinal strips 62. The strips 62 and the spring-like electrically conductive wires 60 are preferably made of an electrically conductive such as copper, plated copper, brass, aluminum and stainless steel.

Now referring to FIGS. 4, 5 and 6, it is shown that the inner cylinder 52 incorporates the inner electrode 50. The inner cylinder 52 is concentrically positioned inside the outer cylinder 52 and it is spaced apart and electrically insulated therefrom by the covers 32 as explained previously. The inner cylinder 52 has an outer surface 54 facing the inner surface 43 of the outer cylinder 42. The inner cylinder 52 extends through the tube 30 and through the covers 32. Advantageously, the inner cylinder 52 is made of electric and heat conductive material selected from the group consisting of conductive composite, graphite, steel, stainless steel, brass, copper, tungsten, molybdenum, aluminum, and alloys thereof.

In the preferred embodiment shown in FIGS. 4, 5 and 6, the inner cylinder 52 is hollow and forms an inner duct 55. Advantageously, the inner duct 55 is connected with other components such that a flow of a gas or of a liquid circulates inside the inner duct 55 permitting thereby to regulate accordingly the temperature inside the corona tube(s) 30. Preferably, a flow of a gaseous refrigerant such as compressed air, ammonia, carbon dioxide, nitrogen or of a cooled dielectric fluid such as high voltage transformer oils, circulates within the inner cylinder 52 in order to lower the temperature inside the tube(s) 30 and the reactor 1.

Preferably, the outer surface 54 of the inner cylinder 52 is provided with a plurality of protrusions 56 obtained by chemical etching or electroforming of the outer surface 54. In a preferred embodiment, the protrusions 56 are obtained by machining the outer surface 54 with two sets of parallel grooves having a low depth and a "V" shaped cross-section therefore resulting in square based pyramids wherein the tips define a plurality of points. The protrusions 56 may be distributed throughout the outer surface of the inner cylinder or limited to specific zones 57 as shown in FIGS. 4 and 5. The protrusions 56 create turbulence in the flow of gas circulating into the gap 45, thereby increasing the pathway of the flow and the oxidation of the volatile compounds.

The outer surface 54 of the inner electrode 50 and/or the protrusions 56 may be further coated by any appropriated means known in the art with a metal catalyst that will not be affected by ozone or the corona environment. Of course, the choice of the catalyst will vary with respect to the nature of the pollutants to be eliminated. Such a catalyst may be selected from the group consisting of $PdCl_2$—MgO—u, $Mn^{2+}$, Co, BiCu, CoCu, Ag, ZnO, Cu—Mn, V—Cu, Cu—Mn, VCu, $Co^{2+}$, UO—$MoO_3$—Cu, Ag, AgO, Mo, W, Ti, V, $V_2O_5$—$K_2SO_4$, Mo—V—P—Na, V—P, Mn—Co, a combination thereof or alloys containing them. The metal catalyst will help in further oxidizing the VOC and other undesirable compounds remaining in the gaseous effluents.

According to the present invention, it is further possible to combine the ozone producing tubes 30, the metal catalyst and the UV lamp 10 into a single device (viz. the corona discharge reactor 1) instead of installing these elements in series as shown in FIG. 1. According to this preferred embodiment which is best shown in FIGS. 3 to 5, the reactor 1 further comprises at least one UV lamp 10 capable of producing UV rays with an electromagnetic wave length comprised preferably between about 189 and about 254 nm. More preferably a plurality of UV lamps 10 are positioned between the longitudinal tubes 30 and close to the outer surface 44 of the outer cylinder 42. The UV rays produced by the lamp(s) 10 will further oxidize the compounds contained in the effluents flowing between the electrodes 40,50. Accordingly, the outer cylinder 40 will be made of a material providing a UV transparency. Advantageously, the outer cylinder 40 is made of a dielectric and UV permeable material such as quartz and it is coated with a transparent electrically conductive material such as tin-oxide, tin-indium oxide or very thin layers of gold, chrome or other precious/semi-precious metals.

In view of the above, it can be appreciated that according to a most preferred embodiment of the invention, the gaseous effluents and the VOC contained therein flow into the reactor 1 where they are subjected to a high voltage corona producing ozone and simultaneously to a UV treatment and a metal catalyst oxidation. This creates a highly oxidative environment wherein it is possible to break down VOC, $H_2S$, $NH_4$, mercaptans and chlorinated solvents into $CO_2$, $H_2O$, $SO_2$, and other by-products. The undesirable by-products or compounds not entirely oxidized may be removed before exiting the chimney using a spray of water or of mildly alkaline solution as explained previously, or they can be treated by other methods known in the art. Moreover, some of the oxidation reactions are exothermic and therefore contribute to increase the temperature of the treated gaseous effluent which may be a desirable factor for catalyzing the decomposition of some organic pollutants. Furthermore, the temperature inside the reactor 1 of the present invention may be regulated as explained previously. A person skilled in the art will be able to safely operate the present invention outside the low and high explosion limits to avoid any risks of explosions or fire hazards.

The flow rate treated by invention is a function of several parameters such as the size of the chimney 2, the size of the corona reactor 1, the number and length of the tubes 30 and of the gaseous flow speed. For instance, given a chimney measuring 60 cm in diameter and a VOC stream comprising mainly of short chain alkanes such as gasoline, the reactor and method of the present invention could treat 100 ppm of VOC to 10 000 ppm of VOC at a flow rate of 700 $m^3$/hr to 7 $m^3$/hr respectively. As aforesaid, the principle asset of the reactor 1 of the invention is that it is quite easy to build and repair and further relatively inexpensive to operate. Further, since the reactor 1 operates at a relatively low temperature (50° C.–200° C.), as compared to the closest known competitive technologies which must function at much higher temperatures (700° C.–800° C.), the reactor of the invention requires less than ⅓ to ¼ of the energy which is necessary by the other technologies known in the art to achieve the same results. A lower temperature of oxidation also reduce greatly the amount of noxious $NO_x$ which are generally produced during the reaction.

In summary, the main advantages of the corona reactor 1 of the invention are as follows:

Based on the corona discharge principle;
Modular design;
Can be air or liquid cooled;
Works with low and high frequency to extend the life of dielectric and power supply;
Produces high ozone concentrations: each corona lamp can produce from about 5–20 g/hour with air feed, and about 10–50 g/hour with oxygen feed;
Has a low power consumption;
Can be compact and fully automated;
Easy maintenance;
Interface with existing installations;
Variable output from 10% to 100% of nominal output;
Rugged and reliable; and
Skid mounting is possible.

EXAMPLE 1

Working tests to demonstrate the efficiency of the device and of the method of the invention were done using a prototype similar but simpler to the chimney shown in FIG. 1. The prototype comprised four major elements, namely a multi-section duct having an inlet and an outlet and having therein a corona reactor according to the invention, a catalytic bed and a scrubbing water spray. The VOC studied was regular unleaded gasoline. Test results obtained with this prototype are shown in Table 1.

Materials and Methods

The first section of the prototype consisted of a 4-inch diameter PVC duct measuring 5 feet in height. A 100 cfm nominal fan (Minebea Co. Ltd., model number 4715FS-12T-B50) was located at the inlet of the duct and served to evaporate the VOC (regular unleaded gasoline) from either a saturated cotton pad placed above the fan or from a small hemi-spherical reservoir with a capacity of 600 ml placed below the fan. A constant VOC concentration was maintained at the inlet by feeding either the cotton pad or the reservoir with gasoline at the same rate as it was being evaporated. The fan was controlled using a potentiometer (KB Electronics, model KBWC-15™). This in turn controlled the speed of evaporation of the VOC and ultimately set the VOC concentration at the inlet of the duct. The flow rate of the VOC stream under each set of conditions was determined by measuring the time required to fill a 1 $ft^3$ plastic bag placed at the ducts outlet. The inlet VOC concentration inside the duct was measured by placing a MINI-RAE™ handheld VOC monitor at the outlet of the duct prior to turning on the corona reactor. This measurement is referred to as VOC in in Table 1.

A corona discharge reactor according to the invention and having a single corona lamp, was installed inside the duct.

The VOC stream was directed vertically through the corona reactor such that the low pressure VOC laden air flowed between the outer and inner electrodes of the corona lamp. For this experiment, two types of corona lamps were studied, namely a 30 inch lamp (about 76 cm) producing about 2 to 3 gram of ozone per hour and a 15 inch lamp (about 38 cm) producing about 0.5 to 1 gram of ozone per hour with regular non-dried air feed. The corona lamps were powered by a 60 Hz low frequency power supply (Ozomax, model number TRANSFORMER-LT™) operating at maximum power yielding a secondary voltage of 14 kV when using the 15 inches corona lamp and 18 kV when operating the 30 inches corona lamp. Tests were carded out first using the 15 inch corona lamp which was later removed and replaced with the 30 inch corona lamp.

A second section of the prototype was mounted above the first section comprising the corona reactor described above. This second section consisted of a 90° elbow (Chemkor, PVC schedule 40, 4 inches diameter) and an upper aluminum duct measuring 23 inches long and 4 inches in diameter. A honeycomb structured solid catalytic converter measuring 4 inches in diameter and 3 inches high was installed into the aluminum duct. The catalytic converter comprised two types of platinum-palladium-rhodium based Engelhard catalysts which were evaluated separately, namely a Type 1 catalyst oxidizing VOC into water and carbon dioxide and a Type 2 catalyst reducing nitrous oxides into nitrogen and oxygen. The catalytic unit was placed halfway inside the aluminum duct and the duct section covering the catalytic unit was removed and replaced with adhesive copper foil in order to increase the efficiency of heat transfer when heating the catalyst. The catalyst was heated by placing a 125 W heating coil (Omega, model No FGR-030) on the outside of the copper foil. Tests were performed at both room temperature 20° C. and at 100° C. The temperature was measured by placing a thermocouple (Type K, chrome anode, aluminum cathode) on the outside of the copper foil and allowing the temperature to reach its steady state value.

Finally, in some experiments, the oxidation products were removed from the gaseous effluents by using a fine atomized water spray. A 90° full cone spray nozzle (Spray Systems Co., IIIISJ9013) was used and water was supplied therein at a flow rate of 1.5 gpm and 30 psi.

VOC measurements were taken at the prototype duct outlet using a MINI-RAE™ handheld monitor. These measurements are referred to as VOC out in Table 1 below. The efficiency of each set of conditions was evaluated by calculating the VOC % destruction as per the following equation. It is desired to maximize this ratio.

$$\% \text{ destruction} = \left[\frac{\text{VOC in} - \text{VOC out}}{\text{VOC in}}\right] \times 100$$

Discussion

Table 1 below summarizes the results obtained using the prototype described above.

TABLE 1

| Flow rate (CFM)[1] | Water (GPM)[2] | $O_3$ (gr/hr)[3] | Catalyst[4] | Catalyst Temp. (° C.)[5] | VOC in (PPM)[6] | VOC out (PPM)[6] | Destruction (%) |
|---|---|---|---|---|---|---|---|
| 1 | 0 | 2–3 | type 1 | 20 | 3339 | 2649 | 21 |
| 1 | 0 | 2–3 | type 1 | 20 | 3070 | 2413 | 21 |
| 1 | 0 | 2–3 | type 1 | 100 | 1155 | 215 | 81 |
| 1 | 0 | 2–3 | type 1 | 100 | 1155 | 180 | 84 |
| 1 | 1.5 | 2–3 | type 1 | 100 | 1155 | 23 | 98 |
| 1.5 | 1.5 | 0.5–1 | type 1 | 20 | 650 | 65 | 90 |
| 1.5 | 1.5 | 0.5–1 | type 2 | 20 | 410 | 80 | 80 |

[1]CFM = cubic feet per minute of VOC laden air
[2]GPM = gallons per min of water used during water spray scrubbing
[3]$O_3$ produced in grams/hour by the corona lamps of the reactor
[4]Type 1 = oxidizing catalyst
Type 2 = reducing catalyst
[5]Catalytic unit steady state temperature
[6]VOC measurements were done using a MINI-RAE ™ handheld monitor.

As shown, the corona discharge reactor of the invention used alone (without catalyst and without spray) proved to be effective to destroy the VOC (21%). Indeed, at 20° C. the catalyst contained in the catalytic unit is ineffective and absence of catalyst would have given similar results. Increasing the temperature of the catalytic unit yielded a higher percentage of VOC destruction (81–84%). As expected, the oxidizing catalyst (Type 1) yielded a higher % VOC destruction than the reducing catalyst (Type 2).

It was also demonstrated that better results could be obtained when the reactor of the invention (with a 30 inches corona lamp) was combined with the Type 1 catalyst heated to 100° C., and a final water scrubbing carried out a flow rate of 1.5 gpm of water. Under these conditions 98% destruction of the VOC was achieved. Up to 90% VOC removal was observed when using a reactor having the shorter 15 inches corona lamp and a 1.5 gpm water spray. Two replicates of each experiment were performed and proved the results to be very reproducible.

Therefore the reactor of the invention was found to be versatile in that it may efficiently eliminate VOC from gaseous effluents under a variety of conditions, such as, with or without the use of a water spray, with or without a catalyst and under a range of ozone production rates. Thus, results of these experiments clearly demonstrate the efficiency of the method and of the corona discharge reactor of the invention which enhances, in an unexpected ratio, the destruction of pollutants. Furthermore, it is assumed that a reactor combining a plurality of corona lamps according to the invention would have given even more impressive results.

Of course, numerous modifications could be made to the present invention according to the preferred embodiments disclosed hereinabove without departing from its scope as defined in the appended claims.

What is claimed is:
1. A method for the oxidation of volatile organic compounds contained in gaseous effluents, comprising:
   a) providing an electrical corona discharge reactor for producing ozone;

b) supplying an electric current to said reactor in order to generate corona discharge;

c) passing the gaseous effluents upstream of the corona discharge reactor through a condenser in order to reduce the amount of water contained in said gaseous effluents and through a filter in order to remove solid particles also contained in said gaseous effluents before said gaseous effluents are passed through said reactor;

d) then passing the gaseous effluents through said corona discharge reactor in order to oxidize the volatile organic compounds contained in the gaseous effluents by the ozone generated in;

e) causing the gaseous effluents also to contact a metal catalyst in order to further oxidize volatile organic compounds contained in said gaseous effluents; and f) subjecting the gaseous effluents also to UV radiation in order to further oxidize volatile organic compounds contained in said gaseous effluents.

2. The method of claim 1, wherein the electrical corona discharge reactor comprises at least two spaced apart electrodes between which the gaseous effluents flow.

3. The method of claims 2, wherein said electrodes are incorporated respectively into two concentric outer and inner cylinders, the outer cylinder forming an outer duct wherein the gaseous effluents flow, the inner cylinder being concentrically positioned inside the outer cylinder and being spaced apart and electrically insulated therefrom.

4. The method of claim 3, wherein the outer cylinder has an inner surface and an outer surface, a first one of said electrodes being incorporated to the outer surface of the outer cylinder.

5. The method of claim 4, wherein the outer surface of the outer cylinder is coated with an electrically conductive material and wherein the outer cylinder is made of a dielectric material.

6. The method of claim 4, wherein said first electrode comprises a plurality of electrically conductive strips extending longitudinally on the outer surface of the outer cylinder, and wherein the outer cylinder is made of a dielectric material.

7. The method of claim 3, wherein the inner cylinder has an outer surface provided with a plurality of protrusions.

8. The method of claim 3, wherein the inner cylinder is hollow and forms an inner duct wherein a flow of gas or liquid circulates.

9. The method of claim 8, comprising the additional step of circulating a flow of gas or of liquid into the inner cylinder to regulate the temperature into the reactor.

10. The method of claim 9, wherein said flow of gas or of liquid is a flow of a cooling gas or of a cooling liquid thereby reducing the temperature into the reactor.

11. The method of claim 1, wherein steps e) and f) are carried out simultaneously with step d) within said corona discharge reactor.

* * * * *